United States Patent [19]
Talaat et al.

[11] Patent Number: 6,097,738
[45] Date of Patent: Aug. 1, 2000

[54] MULTI-SPEED RETAINER

[75] Inventors: M. Magdy Talaat, Mountain View; S. Babar Raza, Santa Clara, both of Calif.

[73] Assignee: Cypress Semiconductor Corp., San Jose, Calif.

[21] Appl. No.: 08/966,938

[22] Filed: Nov. 10, 1997

[51] Int. Cl.⁷ .................................................... H04J 1/10
[52] U.S. Cl. .......................................... 370/492; 370/463
[58] Field of Search .................................... 370/274, 401, 370/407, 408, 402, 492, 501, 406, 285, 315, 463, 279, 252, 462, 293

[56] References Cited

U.S. PATENT DOCUMENTS

| | | | |
|---|---|---|---|
| 4,069,392 | 1/1978 | Goldenberg et al. | 178/58 R |
| 5,263,172 | 11/1993 | Olnowich | 395/800 |
| 5,485,456 | 1/1996 | Shtayyer et al. | 370/60 |
| 5,566,203 | 10/1996 | Brief et al. | 375/211 |
| 5,596,575 | 1/1997 | Yang et al. | 370/468 |
| 5,631,905 | 5/1997 | Yano | 370/462 |
| 5,675,735 | 10/1997 | Gallagher et al. | 395/200.01 |
| 5,703,872 | 12/1997 | Boggs et al. | 370/252 |
| 5,742,602 | 4/1998 | Bennett | 370/401 |
| 5,754,540 | 5/1998 | Liu et al. | 370/315 |

OTHER PUBLICATIONS

S. Babar Raza et al., U.S.S.N. 08/970,059 Architecture for a Dual Segment Dual Speed Repeater, filed Nov. 13, 1997.
S. Babar Raza et al., U.S.S.N. 08/970,058 Architecture for a Dual Segment Dual Speed Repeater, filed Nov. 13, 1997.
M. Magdy Talaat et al., U.S.S.N. 08/976,410 Distributed Port Select Method for a Multi–Segment Repeater, filed Nov. 21, 1997.

*Primary Examiner*—Ajit Patel
*Assistant Examiner*—Brian Nguyen
*Attorney, Agent, or Firm*—Christopher P. Maiorana, P.C.

[57] ABSTRACT

A circuit and method comprising a first logic circuit, a second logic circuit and a speed detect circuit. The first logic circuit may be configured to present a global signal in response to a plurality of first speed indication signals. The speed detect circuit may be configured to present a plurality of second speed indication signals in response to an input operating at one of a plurality of speeds. The second logic circuit may be configured to present a plurality of internal speed indication signals, each in response to (i) the global signal and (ii) one of the plurality of the speed indication signals.

15 Claims, 2 Drawing Sheets

MULTI-SPEED RETAINER

FIELD OF THE INVENTION

The present invention relates to computer networks generally and, more particularly, to a circuit and method for connecting Physical Layer Devices (PHYs) to a multi-segment, multi-speed repeater hub.

BACKGROUND OF THE INVENTION

Computer networks allow the connectivity of a number of nodes through a physical network layer. The physical layer is generally connected through a number of repeaters, often configured in a hub or core. A number of different physical layer speeds exist, such as 10baseT Ethernet, 100baseT Ethernet, etc. Variations of Physical Layer Devices (PHYs) may be implemented by introducing various protocol speeds. Each particular physical layer device speed variation must generally provide a separate speed indication signal (e.g, a link signal), through a separate external pin.

Referring to FIG. 1, a circuit 10 is shown implementing one conventional approach for providing a physical layer device that operates at a number of speeds. The circuit 10 generally comprises a repeater 12 and a physical layer device 14. The physical layer device 14 has an output 16 that presents a receive clock signal (i.e., RX_CLK). The physical layer device 14 also comprises a number of outputs 18a–18n that present a number of speed indication link signals (i.e., LINK1–LINKn). The repeater 12 includes an input 20 and a number of inputs 22a–22n. The input 20 generally receives the receive clock signal RX_CLK, while the inputs 22a–22n generally receive the link signals. For a physical layer device 14 that operates at three different speeds, four separate pins must be included at the repeater boundary, one for the receive clock signal RX_CLK, and one for each of the link signals. Since a number of physical layer devices 14 are generally coupled to a single repeater 12, the number of pins required to connect the physical layer devices 14 to the repeater 12 may require a larger package, which is undesirable since it increases the overall production cost and size of the device. The particular link signals provide an indication that the physical layer device 14 has detected a link at a remote device at the speed specified by the particular link signal. Logic inside the repeater 12 generally connects an internal port connected to the physical layer device 14 to the particular internal segment that is running at the speed indicated by the link signal.

Since a number of physical layer devices 14a–n are generally connected to a single repeater 12, the number of external pins required increases. Referring to FIG. 2, a block diagram illustrating a number of physical layer devices 14a–n each having three link signals connected to a repeater 12 is shown. To implement four physical layer devices 14a–n each having three separate speeds, twelve separate link pins are generally required at the repeater 12. As the number of physical layer devices 14a–n increases, as well as the number of speeds increases, the overall number of pins needed at the repeater 12 becomes prohibitive.

SUMMARY OF THE INVENTION

The present invention concerns a circuit and method comprising a first logic circuit, second logic circuit and a speed detect circuit. The first logic circuit may be configured to present a global signal in response to a plurality of first speed indication link signals. The speed detect circuit may be configured to present a plurality of second speed indication signals in response to an input operating at one of a plurality of speeds. The second logic circuit may be configured to present a plurality of internal speed indication signals, each in response to (i) the global signal and (ii) one of the plurality of said speed indication signals.

The objects, features and advantages of the present invention include providing a reduce pin count repeater that (i) provides proper operation of a number of physical layer devices that may each be configured to operate at one of a plurality of speeds, (ii) allows a greater number of ports to be connected to a repeater package, and (iii) provides a less expensive and more popular package that can be used for the repeater.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a circuit and method for combining the link signals of a number of physical layer devices into a single global signal (e.g., a global link signal) that may be presented to an ethernet repeater. The global signal generally requires only a single pin at the repeater to connect each physical layer device. The repeater implements a speed detect logic circuit that receives the clock input from each physical layer device and determines the link speed. The output from the speed detect circuit may be combined with the link input to reproduce the individual link signals internally to the repeater. As a result, the number of external pins to the repeater is reduced.

Figure 1:
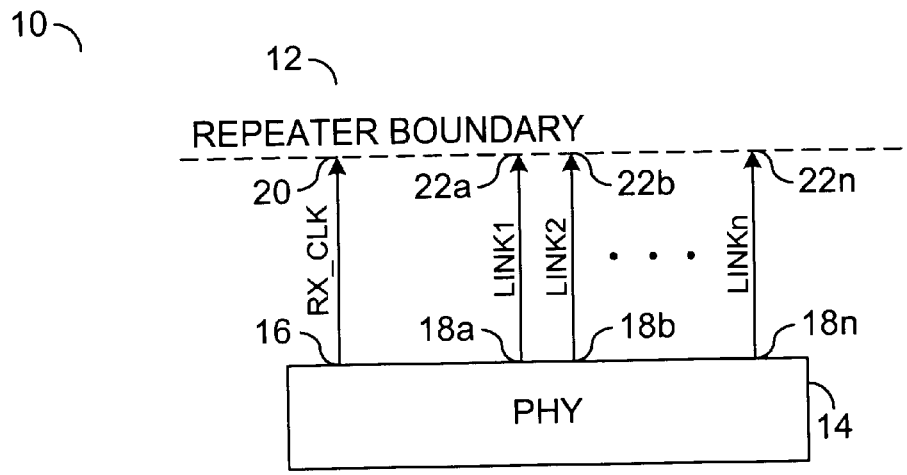
FIG. 1 is a block diagram of a conventional method for connecting a physical layer device operating at a number of speeds to a repeater core.
Figure 2:
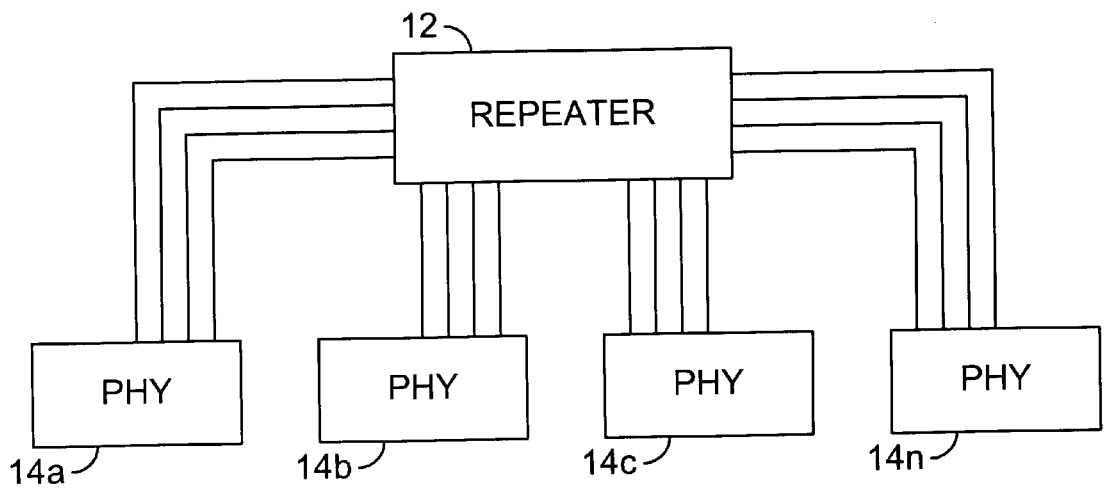
FIG. 2 is a diagram illustrating a number of the interconnections required to connect a number of physical layer devices to a repeater core.
Figure 3:
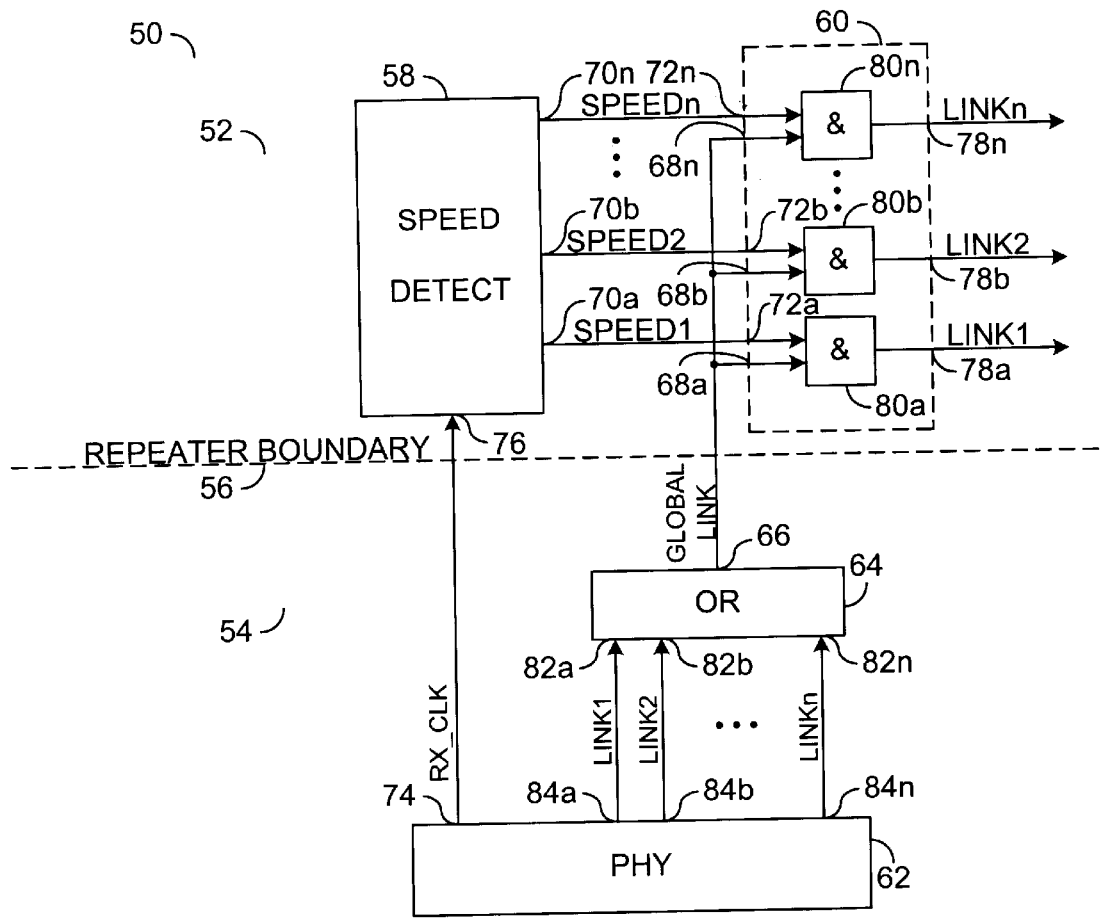
FIG. 3 is a block diagram of a preferred embodiment of the present invention.

Referring to FIG. 3, a block diagram of a circuit 50 is shown in accordance with a preferred embodiment of the present invention. The circuit 50 generally comprises a repeater section (or circuit) 52 and a physical layer section (or circuit) 54. A repeater boundary 56 generally marks the separation between the physical layer section 54 and the repeater section 52. The repeater section 52 generally comprises a speed detect circuit 58 and a logic circuit 60. The physical layer section 54 generally comprises a physical layer device 62 and a logic section 64.

The logic section 64 has an output 66 that may present the global signal (e.g., GLOBAL LINK) to a number of inputs 68a–68n of the logic section 60. The speed detect circuit 58 has a number of outputs 70a–70n that may present a number of speed indication signals (e.g., SPEED1–SPEEDn) to a number of inputs 72a–72n of the logic circuit 60.

The physical layer device 62 has an output 74 that may present an input signal (e.g., RX_CLK) operating at a particular speed to the input 76 of the speed detect circuit 58. In one example, the signal at the output 74 may be a receive clock signal, such as the signal RX_CLK. The signal presented at the output 74 may be a receive signal RX_CLK that operates at one of a number of operating frequencies. The receive signal RX_CLK may be presented to an input 76 of the speed detection circuit 58. The speed detect circuit 58 generally detects the frequency of the signal RX_CLK received at the input 76 and presents a signal at one of the outputs 70a–70n. In one example, each of the outputs 70a–70n represents a particular known frequency of oscillation that may be present at the input 76. The input 76 will generally oscillate at a frequency that may be closely related to one of the outputs 70a–70n. As a result, only one of the outputs 70a–70n generally has an asserted signal at any given time. The logic circuit 60 has pairs of inputs 68a and 72a through 68n and 72n that may each receive one of the speed signals and the global signal from the output 66 of the logic section 64. As a result, a number of outputs 78a–78n may each present an internal speed indication signal that may be used by logic in a different portion of the repeater circuit 50. The logic section 60 may comprise a number of internal gates 80a–80n. In one example, the gates 80a–80n are AND gates that each receive the global signal from the logic section 64 and one of the speed indication signals from the speed detect circuit 58. However, the logic gates 80a–80n may be implemented as other gates to provide a variety of polarities and/or active high/active low states at the output of the speed detection circuit 58 and the logic section 64.

In a typical network situation, a number of physical layer devices 62 may be connected to the repeater 52. By implementing the circuit 50, only two interconnections between the repeater 52 and the physical layer section 54 may be required for the operation of a physical layer device 62 that operates at a number of operating speeds. The number of pins saved may be (n−1)*m, where n is the number of speeds that the physical layer device 62 may operate, and m is the number of physical layer devices implemented as illustrated by the following TABLE 1:

TABLE 1

| Number of | Number of Speed Options | | | |
|---|---|---|---|---|
| Ports | 2 | 3 | 4 | n |
| 2 | 2 | 4 | 6 | 2(n − 1) |
| 3 | 3 | 6 | 9 | 3(n − 1) |
| 4 | 4 | 8 | 12 | 4(n − 1) |
| m | m | 2m | 3m | m(n − 1) |

In one example, if the number of physical layer devices implemented is 12 devices, and the number of speeds is 4, the pin savings may be significant (e.g., (4−1)*12, or 36 pins).

The logic section 64 may be implemented as an OR type logic that may present the global signal when any of the link signals are present. The logic section 64 has a number of inputs 82a–82n that may receive a number of link signals from a number of outputs 84a–84n of the physical layer device 62. Since each of the speed indication signals presented at the outputs 84a–84n may represent a particular speed of operation of the physical layer device 64, the global signal presented at the output 66 does not generally provide the speed information to the repeater section 52. However, the signal presented at the output 74 is generally a speed dependent signal. The speed detect circuit 58 detects the particular speed of the signal presented at the output 74 and decodes the frequency information that may be presented at the outputs 70a–70n. The internal speed indication signals LINK1–LINKn presented at the outputs 78a–78n essentially reproduce the speed indications presented at the outputs 84a–84n, using a minimum number of interface pins at the repeater boundary 56.

The speed detection circuit 58 may receive the clock signal RX_CLK at the input 76. If the receive clock signal RX_CLK is within a predetermined tolerance of one of a number of known reference speeds, a particular one of the speed indication signals SPEED–SPEED-n may be activated. As a result, the speed of the receive clock signal RX_CLK may be matched with one of the particular reference signals. If none of the speeds match, none of the speed signals SPEED1–SPEEDn will be activated which may indicate that the logic circuit 60 generally will not present internal link signals LINK1–LINKn.

Figure 4:
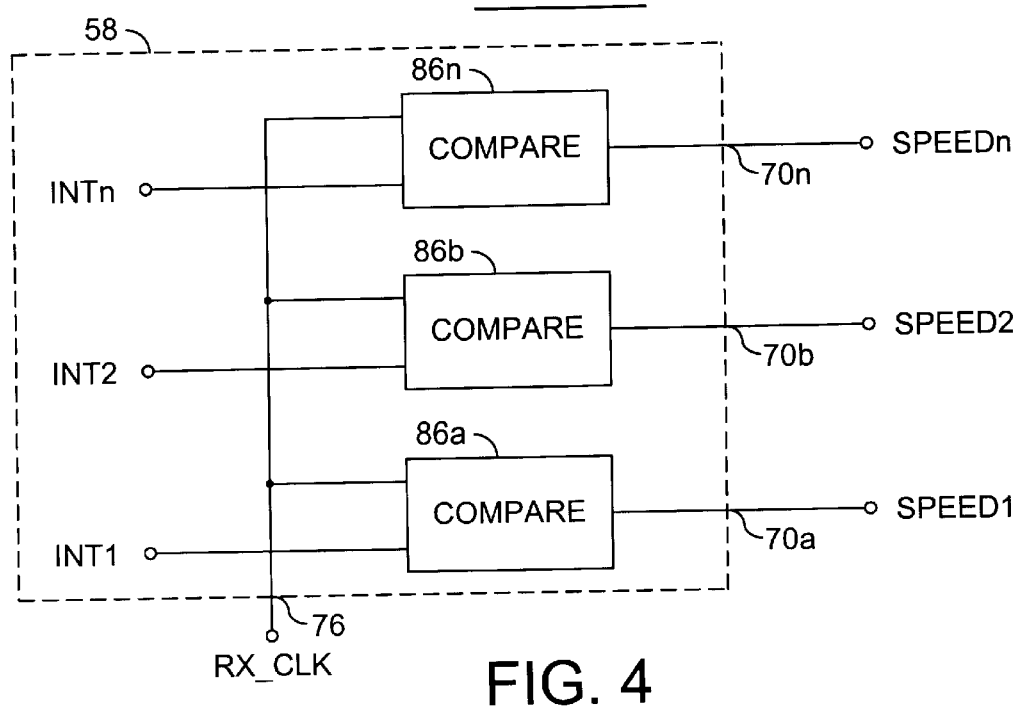
FIG. 4 is a more detailed block diagram of the speed detect circuit of FIG. 3.

Referring to FIG. 4, a more detailed diagram of the speed detect circuit 58 is shown. The speed detect circuit 58 generally comprises a number of compare blocks 86a–86n that may each receive a number of internal reference clock signals INT1–INTn (each representing known PHY speeds) as well as the receive clock signal RX_CLK. Each of the compare blocks 86a–86n, for example the compare block 86a, compares the receive clock signal RX_CLK with one of the internal clocks INT1–INTn. If the frequency of oscillation of the receive clock signal RX_CLK is within a predefined tolerance of the internal clocks INT1–INTn, an active signal will be asserted at one of the appropriate outputs 70a–70n. Each of the compare blocks 86a–86n may be implemented as a circuit that compares two frequencies, such as found in co-pending application entitled "Circuit and Method for Measuring the Difference Frequency Between Two Clocks", U.S. Ser. No. 08/919,999, which is hereby incorporated by reference in its entirety. The incorporated reference concerns a circuit method for generating a difference clock from a reference clock and a second clock.

While the invention has been particularly shown and described with reference to the preferred embodiments thereof, it will be understood by those skilled in the art that various changes in form and details may be made without departing from the spirit and scope of the invention.

What is claimed is:

1. The circuit comprising:
   a first logic circuit configured to present a global speed indication signal in response to a plurality of first speed indication signals;
   a speed detect circuit configured to present a plurality of second speed indication signals in response to an input signal operating at one of a plurality of speeds, wherein only one of said plurality of second speed indication signals is in an active state at any given time; and
   a second logic circuit configured to present a plurality of internal speed indication signals, each in response to (i) said global signal and (ii) said plurality of second speed indication signals, wherein only one of said plurality of internal speed indication signals is in an active state at any given time.

2. The circuit according to claim 1, wherein said first logic circuit presents said global signal when one of said plurality of first speed indication signals is active.

3. The circuit according to claim 1, wherein said second logic circuit comprises a plurality of internal gates equal to said plurality of first speed indication signals.

4. The circuit according to claim 3, wherein each of said plurality of gates receives (i) said global signal and (ii) one of said plurality of second speed indication signals.

5. The circuit according to claim 4, wherein each of said logic gates comprises an AND gate.

6. The circuit according to claim 1, further comprising:

a physical layer device configured to present said plurality of first speed indication signals and said input signal received by said speed detection circuit.

7. The circuit according to claim 1, further comprising:

one or more first logic circuits;

one or more speed detect circuits; and one or more second logic circuits.

8. The circuit according to claim 1, wherein the one of said plurality of internal speed indication signals that is active corresponds to the one of said plurality of second speed indication signals that is active.

9. The circuit according to claim 1, wherein said speed detect circuit comprises:

a plurality of compare circuits each configured to present one of said plurality of second speed indication signals in response to (i) one of a plurality of reference signals and (ii) said input signal operating at one of a plurality of speeds.

10. A circuit comprising:

means for generating a global signal in response to a plurality of first speed indication signals;

means for generating a plurality of second speed indication signals in response to an input signal operating at one of a plurality of speeds, wherein only one of said plurality of second speed indication signals is in an active state at any given time; and means for generating a plurality of internal speed indication signals, each in response to (i) said global signal and (ii) said plurality of second speed indication signals, wherein only one of said plurality of internal speed indication signals is in an active state at any given time.

11. The circuit according to claim 10, further comprising:

means for presenting said plurality of first speed indication signals and said input signal.

12. A method for reducing the number of pins in a repeater comprising the steps of:

generating a global signal in response to a plurality of first speed indication signals;

detecting a speed of an input signal operating at one of a plurality of speeds and generating a plurality of second speed indication signals in response thereto; and generating a plurality of internal speed indication signals, each in response to (i) said global signal and (ii) said plurality of second speed indication signals.

13. The method according to claim 12, wherein only one of said plurality of internal speed indication signals is in an active state at any given time.

14. The method according to claim 12, wherein said global signal is active when one of said plurality of first speed indication signals is active.

15. The method according to claim 12, further comprising the step of:

generating said plurality of first speed indication signals and said input signal in a physical layer device.

* * * * *